Figure 9:
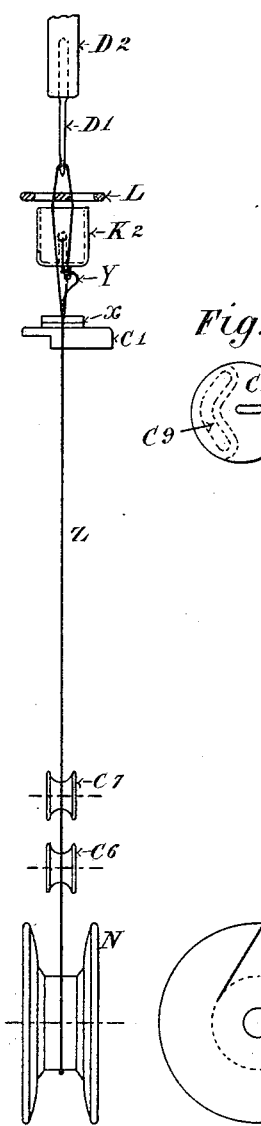

(No Model.) 7 Sheets—Sheet 1.
J. W. RAMSDEN & H. S. ELLIS.
SEWING MACHINE.
No. 348,474. Patented Aug. 31, 1886.
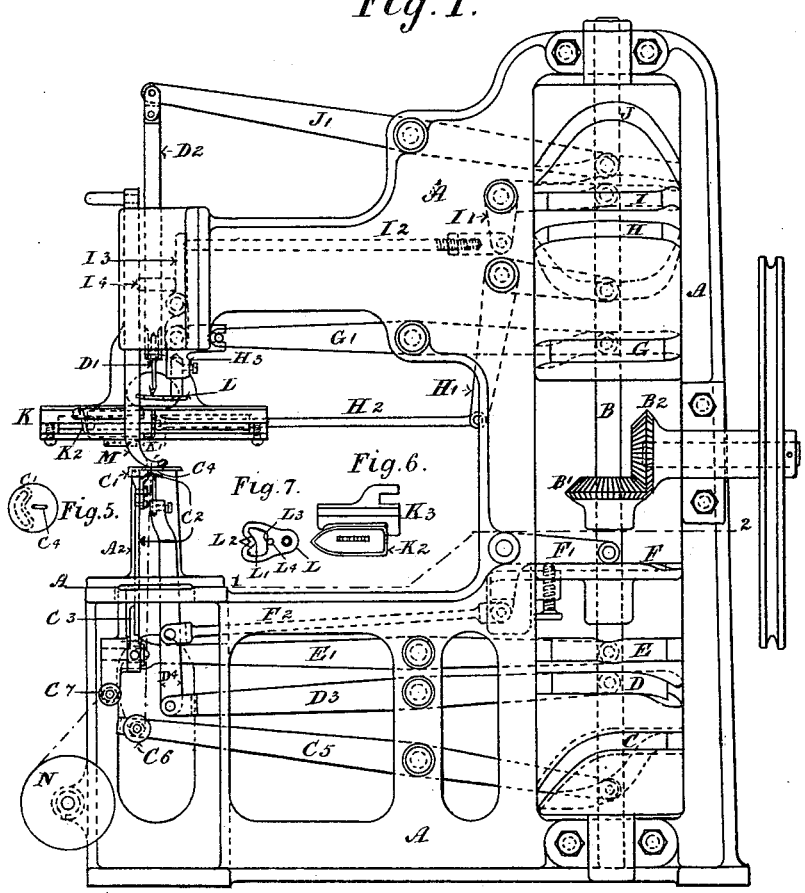
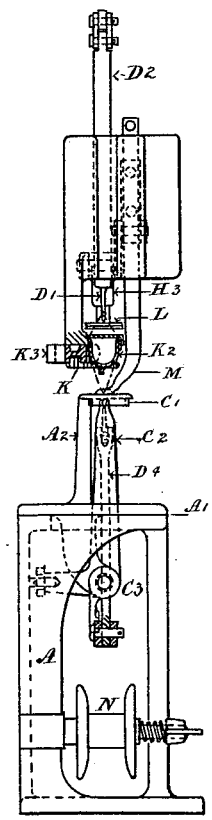
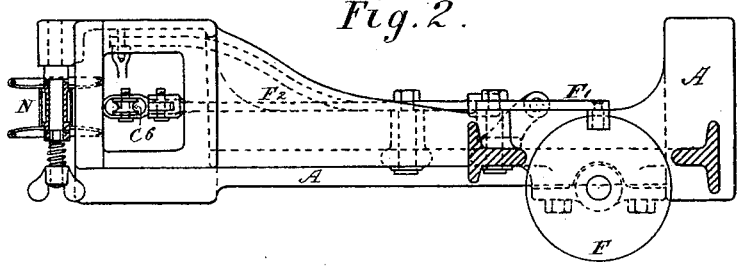
Witnesses.
Thos. E. Craven
William Sadler
Inventors.
John William Ramsden
Harry Senior Ellis

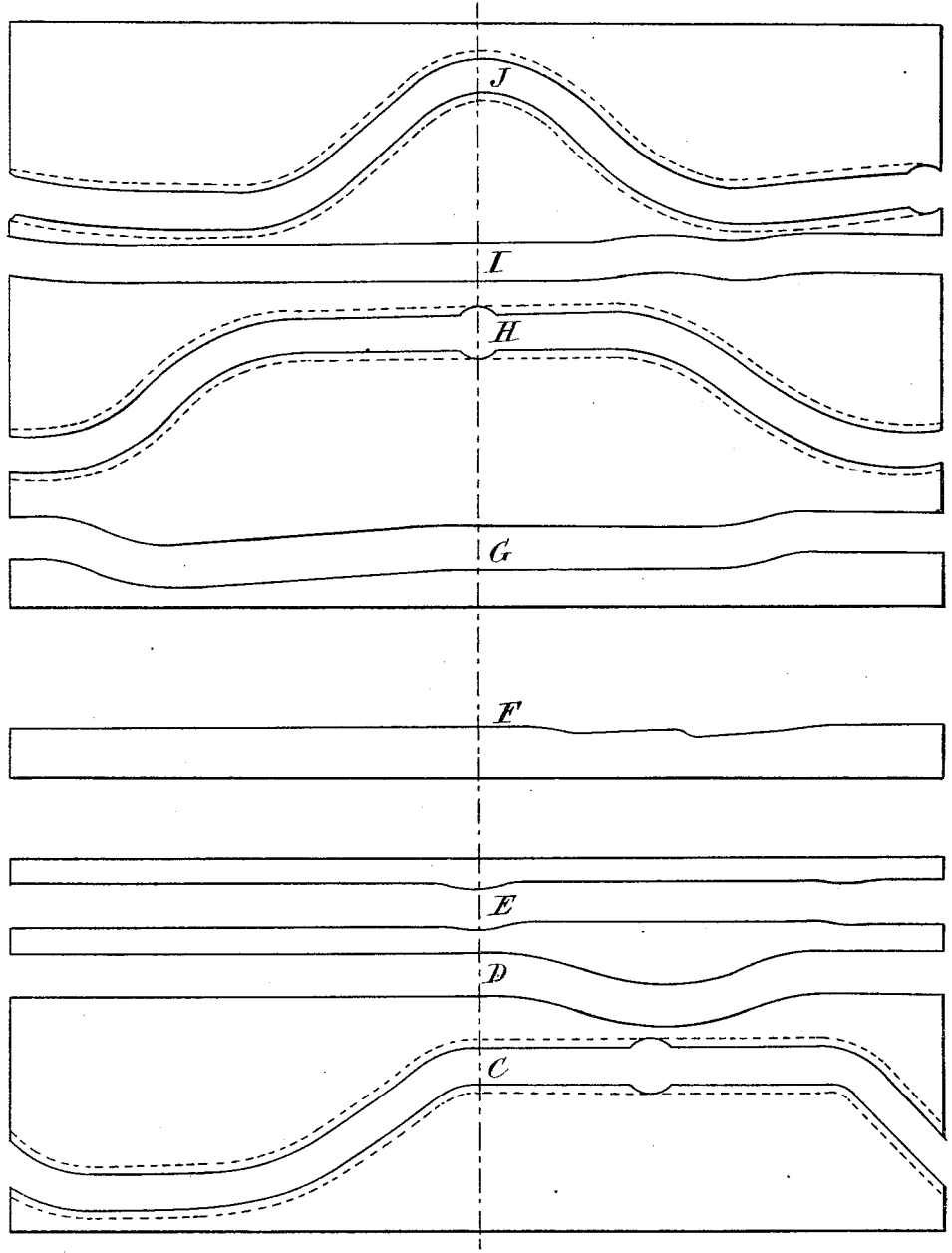

(No Model.) 7 Sheets—Sheet 3.

J. W. RAMSDEN & H. S. ELLIS.
SEWING MACHINE.

No. 348,474. Patented Aug. 31, 1886.

Witnesses.
Thos E Craven
William Sadler

Inventors
John William Ramsden
Harry Senior Ellis
Per M H Doolittle
Attorney.

(No Model.) 7 Sheets—Sheet 4.

J. W. RAMSDEN & H. S. ELLIS.
SEWING MACHINE.

No. 348,474. Patented Aug. 31, 1886.

Witnesses.
Thos E Craven
William Sadler

Inventors.
John William Ramsden
Harry Senior Ellis
Per W. R. Doolittle
Attorney (No Model.) 7 Sheets—Sheet 5.

J. W. RAMSDEN & H. S. ELLIS.
SEWING MACHINE.

No. 348,474. Patented Aug. 31, 1886.

Witnesses.
Thos. E. Craven
William Sadler

Inventors.
John William Ramsden
Harry Senior Ellis
Per M. R. Doolittle
Attorney (No Model.) 7 Sheets—Sheet 6.
J. W. RAMSDEN & H. S. ELLIS.
SEWING MACHINE.
No. 348,474. Patented Aug. 31, 1886.
Fig. 19.
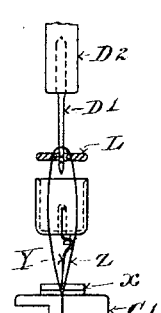
Fig. 18.
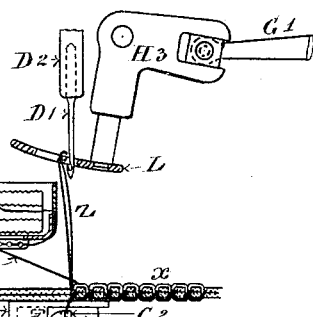
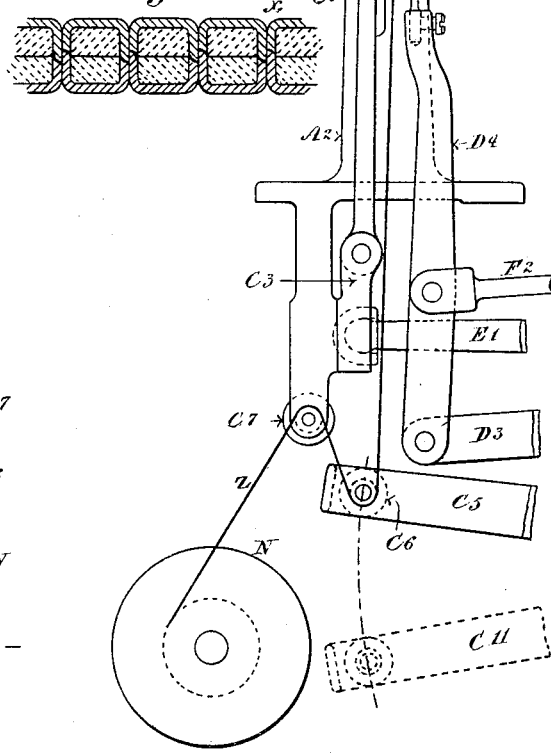
Fig. 20.
Witnesses.
Thos. E. Craven
William Sadler
Inventors.
John William Ramsden
Harry Senior Ellis.
Per W. R. Doolittle
Attorney.

(No Model.) 7 Sheets—Sheet 7.

J. W. RAMSDEN & H. S. ELLIS.
SEWING MACHINE.

No. 348,474. Patented Aug. 31, 1886.

Witnesses.
Thos. E. Craven
William Sadler

Inventors
John William Ramsden
Harry Senior Ellis.
Per W. H. Doolittle
Attorney.

UNITED STATES PATENT OFFICE.

JOHN WILLIAM RAMSDEN AND HARRY SENIOR ELLIS, OF LEEDS, COUNTY OF YORK, ENGLAND.

SEWING-MACHINE.

SPECIFICATION forming part of Letters Patent No. 348,474, dated August 31, 1886.

Application filed August 18, 1885. Serial No. 174,699. (No model.) Patented in England November 8, 1884, No. 14,746; in France August 5, 1885, No. 170,501; in Germany August 7, 1885, No. 35,883, and in Austria-Hungary September 27, 1885, No. 29,117.

*To all whom it may concern:*

Be it known that we, JOHN WILLIAM RAMSDEN and HARRY SENIOR ELLIS, subjects of the Queen of Great Britain and Ireland, residing at Leeds in the county of York, Kingdom of Great Britain and Ireland, engineers, have invented new and useful Improvements in Sewing-Machines, of which the following is a specification, the same having been patented in the following countries: Great Britain, November 8, 1884, No. 14,746; France, August 5, 1885, No. 170,501; Austria-Hungary, September 27, 1885, No. 29,117, and Germany, August 7, 1885, No. 35,883.

Our invention relates to improvements in that class of sewing-machines in which two waxed threads are used by means of a hooked needle and shuttle working above the work or material to be sewed, and more particularly to a novel disposition of a reciprocating shuttle with its attendant loop dividing and stripping apparatus.

In a machine of the type to which our invention refers a hooked needle mounted and actuated in the usual manner, by means of a lever and cam on the main shaft of the machine, pierces the work or material to be sewed, which rests upon a stitching-plate. Thread is introduced into the opening in the hook by means of a looper. This looper is in the form of a lever, which rocks on a pivot and has an eyelet for the thread to pass through at its upper end. Reciprocating motion across and in front of the opening in the hooked needle is imparted to the looper-lever by means of a cam on the main shaft of the machine. Now, according to our invention the looper has imparted to it a curvilinear motion instead of a straight to-and-fro motion, as heretofore. This is accomplished by means of a grooved cam-plate of suitable form fixed on the under side of the stitching-plate. A pin on the upper end of the looper works in this cam, which is of such a form that it causes the looper to move across the opening in the hooked needle, and also through about a quarter of a circle around it, thus insuring that the thread shall be introduced into the opening of the hook in whatever direction the work may be fed.

In order to enable a looper such as above referred to, mounted upon a pivot, to have a curvilinear motion, it is made of tempered steel, so that it will spring sufficiently to follow the figure of the cam under the stitching-plate; or a lever having universal joints may be used to effect the same object. Thread having been introduced, in the manner described, into the hooked needle, it continues its ascent and draws the loop of thread through the work or material to be sewed. A reciprocating centrally-pointed shuttle works at right angles to the path of the hooked needle, but with its center line in the same vertical plane as the axis of the needle. This shuttle travels in the direction of the opening in the hooked needle—that is to say, in the direction of the open side thereof. The shuttle is of similar construction to those used in ordinary reciprocating shuttle sewing-machines. It works in a suitable race, with its rounded back immediately over the material to be sewed and is driven by means of a carrier receiving the required motion through a connecting-rod and lever from a cam on the main shaft of the machine. The upper face of the shuttle is open and flat, and a plate that partially covers the top of the race prevents the shuttle from jumping out of it. We prefer to use a cop of thread in the shuttle, and tension is given to the thread in the usual manner. At the point in the center of the shuttle-race where the bar carrying the hooked needle intersects the race the latter is cut away to allow of the bar passing through it. Immediately above the upper flat face of the shuttle-race is a rocking lever, which works upon a pivot fixed to the framing of the machine behind the hooked needle-bar, with its center line in the same vertical plane as the center of the hooked needle-bar and the shuttle-race. This rocking lever has the required reciprocating motion imparted to it by means of a lever from a cam on the main shaft of the machine, and at its lower end is fixed a loop dividing and stripping plate. This plate (which it is preferred to make of an annular form of suitable material, such as steel) has an opening in it so shaped that the bar carrying the hooked needle can pass through it. The hooked needle having received its loop of thread and reached the top of its upward course afterward slightly descends, and at the same time the loop-dividing plate, which has a pointed projection, advances toward the hooked needle. The pointed projection divides the looped thread, and as the hooked needle continues to descend the said pointed projection, which is broader at its base, forces the threads (that is, two opposite parts of the loop) farther apart, so as to permit the now advancing shuttle to enter and pass freely through the loop. Immediately this has been effected the needle-bar makes a further descent, the lever of the loop dividing and stripping plate receives a reverse motion, and the face of the opening in the plate opposite to the pointed projection comes rapidly against the loop and strips it out of the hook. The stitch is then drawn in by a stitch-tightening arrangement working underneath the stitching-plate. We prefer to use a pricker feed-motion working underneath and passing through the stitching-plate, and the locked presser-bar and foot for holding the work in position, usual in this class of machine when used for closing boot-uppers, or sewing belts, harness, or other classes of work.

Referring to the accompanying drawings, Figure 1 is a side elevation of a sewing-machine embodying our invention. Fig. 2 is a plan showing that portion of the machine below the line 1 2. Fig. 3 is a front elevation. Fig. 4 shows the cams (to an enlarged scale) for actuating the various mechanisms of the machine, as hereinafter mentioned. Fig. 5 is a plan of the stitching-plate with grooved cam; Fig. 6, a plan of the shuttle and its carrier, and Fig. 7 a plan of the loop dividing and stripping plate.

A, Figs. 1, 2, and 3, Sheet 1, is the standard or frame-work of the machine.

B is the main shaft, upon which are the cams C D E F G H I J, mounted in bearings in the standard. This shaft is actuated by the wheels B' and B² from any convenient source.

Upon the base at A' is fixed the standard A² for supporting the work or material to be sewed. Upon the said standard is fixed the grooved cam-plate C', (which may, if desired, also form the stitching-plate,) for guiding the looper C² while making a curvilinear movement across and partly around the hooked needle D' and introducing the thread into the hook thereof.

C³ is a bell-crank lever to which is attached the looper C², and which is actuated by the cam E and lever E'.

D⁴ is a pointed or pricker feed-lever mounted on the end of the lever D³, and caused by the cam D actuating the said lever to pass through the slot C⁴ in the cam or stitching plate C' and pierce the work or material to be sewed. While in this position the cam F acts on the bell-crank F', to which the pricker-lever is connected by the link F², and thus advances the work, after which the said lever is, by the combined action of the cams D and F, caused to leave the work and move out of the way of the needle to allow of its descent, and so on for each stitch.

K is the shuttle-race, fixed to the overhanging head of the machine, and having an opening at K' for the passage of the needle D' and its bar D².

K² is the centrally-pointed shuttle, and K³ its carrier. The needle-bar is actuated by the cam J and lever J', and the shuttle by the cam H, lever H', link H², and carrier K³.

L is the loop dividing and stripping plate, carried by the rocking lever H³, and actuated by the cam G and lever G'. Its movements are to be properly timed for opening the looped thread by the action of the projecting point and angular sides L' L², for the passage through the loop of the shuttle, and for stripping the loop from the hooked needle by the action of the part L³, the needle in the meantime having entered the hole L⁴.

M is a pressure-foot, as usually employed in such machines, with its locking arrangement by the cam I, lever I', link I², lever I³, and bolt I⁴.

The cam C, lever C⁵, pulleys C⁶ and C⁷ constitute the stitch-tightening mechanism previously referred to.

N is a reel from which the lower thread is supplied.

The cams C, D, E, F, G, H, I, and J are shown developed in Fig. 4, which represents them in their proper relative positions for producing the required results, as hereinabove indicated.

In addition to the above description the parts, as illustrated in Figs. 8 to 22, inclusive, will now be more particularly described.

Figs. 8 to 11, inclusive, are detached sketches showing in side elevation, front elevation, and plans various novel and other parts employed in the production of a lock-stitch. These novel parts are the cam-plate or stitching-cap C', (the looper and its lever C² are not new,) the centrally-pointed shuttle K², the dividing and stripping plate L, and the bell-crank H³, for carrying and adjusting the same. The remaining parts of the machine are such as are already known.

The said Figs. 8 to 11 show the commencement of the formation of the lock-stitch as effected by our invention, x being the material under treatment.

Figure 8:
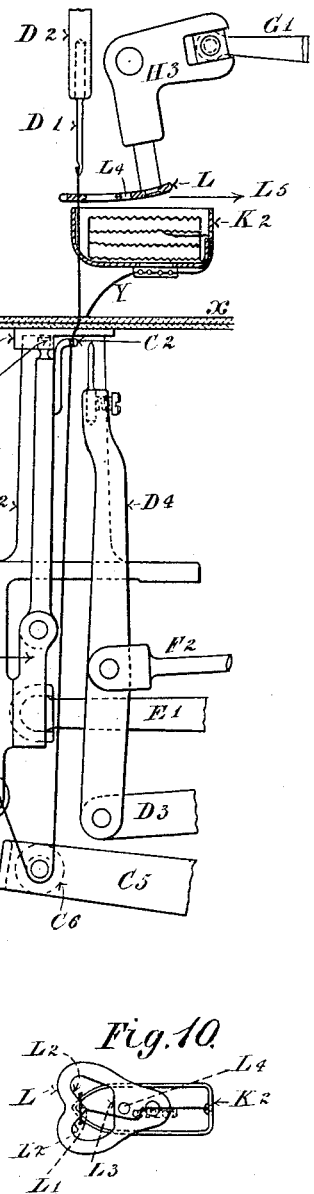

The hooked needle D' is assumed to have made a downward movement, passed through the annular plate L and the shuttle-race K, penetrated the material x, and while in this position it has received the looper-thread Z, as follows: This thread passes from a reel, N, through an eye provided in the looper-lever C². The looper-lever is actuated by a cam, E, on the main shaft of the machine, the lever E', and the bell-crank C³. The upper end, C⁸, of of the said looper-lever takes into the curvilinear groove C⁹ in the cam-plate or stitching-cap C', and is thus caused to make a curvilinear movement partly around the hooked needle, and to throw the thread Z into the hook thereof, after which the needle ascends to the position shown in Figs. 1 and 2, carrying with it that portion of the thread Z which is now above the work in a double or looped form. The dividing and stripping plate L is next caused, by the cam G on the main shaft of the machine, the lever G', and the bell-crank $H^3$, to move in the direction of the arrow $L^5$. Its point L' enters between the looped parts of the thread Z, and by the action of the inclined sides $L^2$ parts the said two portions of the loop, at the same time the centrally-pointed shuttle $K^2$ is caused to advance by the cam H, bell-crank H', link $H^2$, and shuttle-driver $K^3$, to the position shown in Figs. 8 and 10, with its pointed end between the partly-opened loop. The loop is shown partly opened in Figs. 8 and 10. The stitch-tightening apparatus $C^5$ $C^6$, Fig. 8, is shown nearly at its highest position, and for the time being is at rest.

Figure 11:
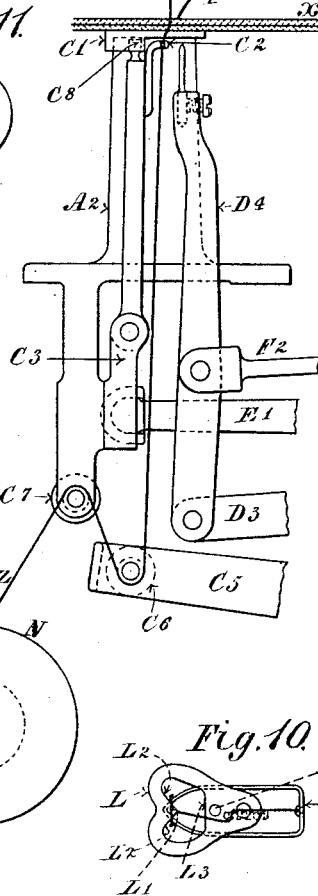
Figure 10:
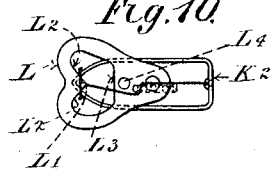

Fig. 11 is a plan of the cam-plate or stitching-cap C', and shows in dots the curvilinear groove $C^9$.

Figure 13:
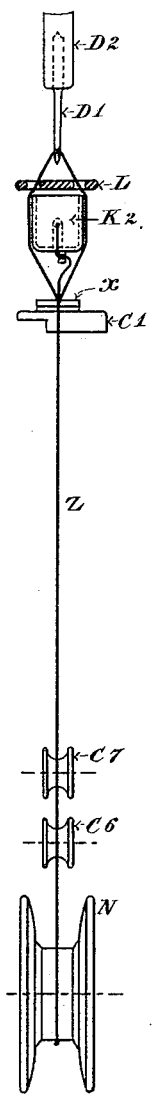
Figure 12:
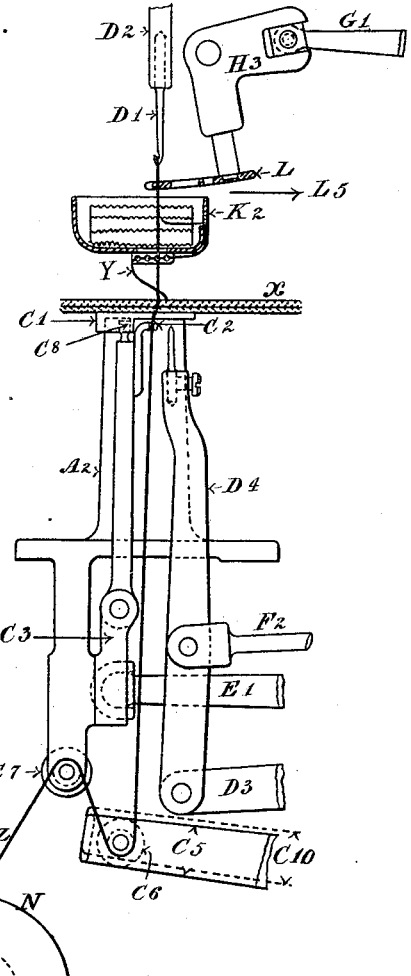
Figure 14:
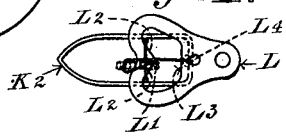

Figs. 12, 13, and 14 show the same parts as those shown in Figs. 8 to 11.

The dividing and stripping-plate L, Figs. 12 and 14, is shown fully advanced in the direction of the arrow $L^5$, and has opened the looped thread Z somewhat wider, as shown in plan, Fig. 14. About this time the stitch-tightening lever $C^5$ has been moved by its actuating-cam C to its highest position, (shown in dots $C^{10}$, Fig. 12,) and thus slackened the looped thread Z, for facilitating the passing of the shuttle $K^2$ to the position shown in Figs. 12 and 14. During this time the needle is stationary.

Figure 16:
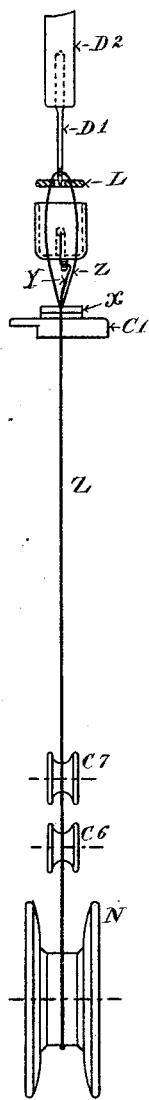
Figure 15:
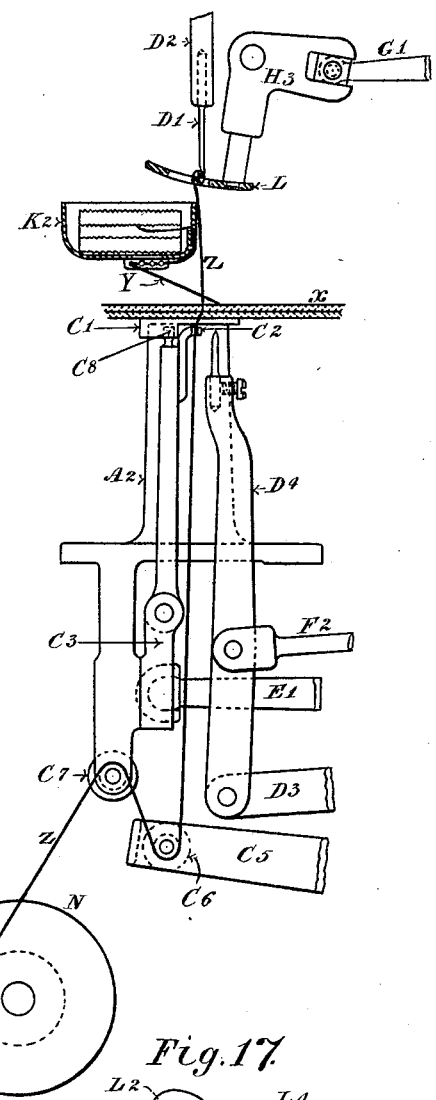
Figure 17:
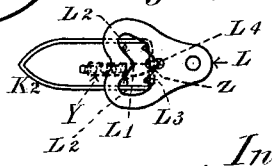

Figs. 15, 16, and 17 show another advance in the formation of the lock-stitch, the shuttle $K^2$ having passed completely through the looped thread Z and carried the shuttle-thread Y through the said loop. By this time the dividing and stripping plate L has made a movement in the contrary direction to those above described, so as to bring the hole $L^4$ to coincide with the center line of the needle, which now descends so far into the hole $L^4$, Figs. 18 and 19, that the bar $L^3$ during such descent of the needle acts on the inside of the loop at its upper part (that is, between the loop and the needle) and strips it out of the hook, as shown. Immediately after this the lever $C^5$ of the tightening apparatus makes a downward movement, (shown in dots C'', Fig. 18,) and draws the loop of the thread Z, together with the shuttle-thread Y, (which are now linked together,) into the material x under treatment. The tension applied by the shuttle $K^2$ to the thread Y determines its position in the said material, as shown to an enlarged scale in Fig. 20.

Figure 21:
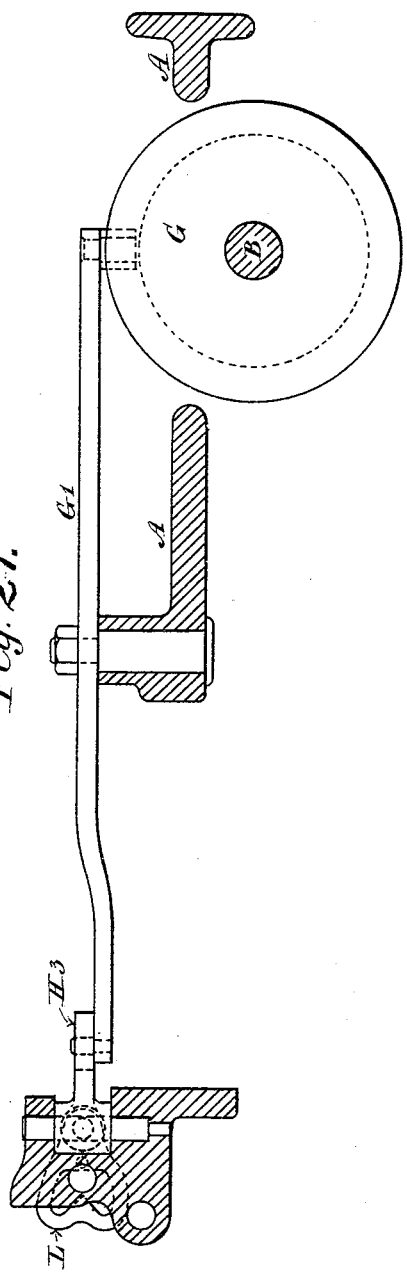

Fig. 21 is a horizontal section, in part, of the machine, showing the main shaft B, cam G, for actuating the lever G', and bell-crank $H^3$, to which the dividing and stripping plate L is attached.

Figure 22:
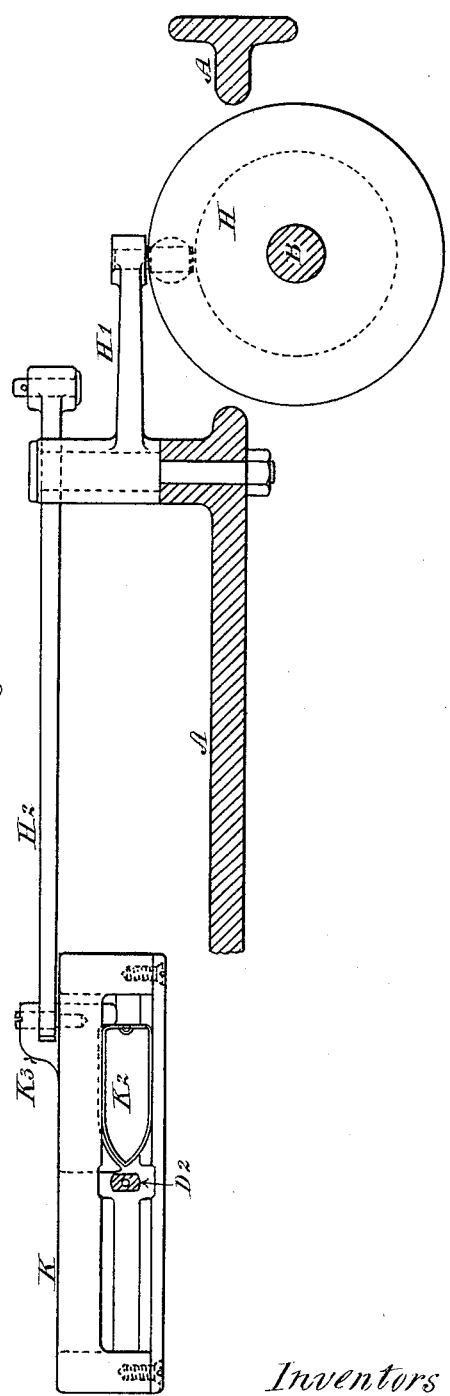

Fig. 22 is a horizontal section, in part, of the machine, showing the main shaft B, the cam H, bell-crank H', link $H^2$, driver $K^3$, for carrying the shuttle $K^2$, the shuttle-race K in plan open in the center to admit of the needle-bar D' and needle-bar $D^2$ passing through it. A lock-stitch having now been completed in the manner hereinabove described, and the various parts of the mechanism having resumed their normal positions, the feed-motion, comprising the cams D and F and the mechanism connecting them to the feed-lever $D^4$, causes the material under treatment to be moved forward ready for another stitch.

What we claim is—

1. In a sewing-machine using two waxed threads, the combination of a hooked needle, a looper, and a work-plate having a curvilinear groove in its under side, with which the looper engages and by which it is guided across and partly around the needle, for the purpose set forth.

2. In a sewing-machine using two waxed threads, having a hooked needle and a looper that travels in a curvilinear path partially around said needle, a shuttle-race situated above the work with an opening therein for the needle and bar to pass through, and a centrally-pointed reciprocating shuttle provided with means for working it in the said race, substantially as herein described and shown.

3. In a wax-thread sewing-machine having a hooked needle, a looper, and a centrally-pointed reciprocating shuttle, the combination therewith of a combined loop dividing and stripping plate, L, and the actuating mechanism, substantially as described.

4. In a wax-thread sewing-machine having a hooked needle and looper in combination therewith, a cam-plate, C', shuttle-race, such as K, a centrally-pointed shuttle, $K^2$, and a combined dividing and stripping plate L, the whole constructed, arranged, and operating substantially as and for the purposes herein set forth.

JOHN WILLIAM RAMSDEN.
HARRY SENIOR ELLIS.

Witnesses:

THOS. E. CRAVEN,
*Fellow Inst. Patent Agent, 24 Victoria Chambers, Leeds.*

WILLIAM SADLER,
*North Street, Leeds.*